(12) United States Patent
Murashige et al.

(10) Patent No.: US 7,294,433 B2
(45) Date of Patent: Nov. 13, 2007

(54) CLOSED ALKALINE STORAGE BATTERY

(75) Inventors: Shinji Murashige, Hirakata (JP); Tetsuo Nanno, Yao (JP); Yoichi Izumi, Moriguchi (JP); Munehisa Ikoma, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 495 days.

(21) Appl. No.: 10/487,233

(22) PCT Filed: Sep. 27, 2002

(86) PCT No.: PCT/JP02/10130

§ 371 (c)(1),
(2), (4) Date: Feb. 26, 2004

(87) PCT Pub. No.: WO03/032427

PCT Pub. Date: Apr. 17, 2003

(65) Prior Publication Data

US 2004/0197647 A1    Oct. 7, 2004

(30) Foreign Application Priority Data

Oct. 1, 2001    (JP)    ............................. 2001-304953

(51) Int. Cl.
*H01M 2/08*    (2006.01)
*H01M 2/12*    (2006.01)

(52) U.S. Cl. ........................ 429/180; 429/53; 429/62; 429/153

(58) Field of Classification Search ................. 429/53, 429/62, 152, 163, 176, 178, 180, 300
See application file for complete search history.

(56) References Cited

U.S. PATENT DOCUMENTS 6,645,668 B2 * 11/2003 Etou ....................... 429/176 X
2004/0053126 A1    3/2004 Hirano et al. ............... 429/153

FOREIGN PATENT DOCUMENTS

| EP | 0948074 | 10/1999 |
|---|---|---|
| JP | 10-208768 | 8/1998 |
| JP | 63-299051 | 12/1998 |
| JP | 2001-57199 | 2/2001 |
| JP | 2001-126690 | 5/2001 |
| JP | 2001-196048 | 7/2001 |

OTHER PUBLICATIONS

Computer-generated English translation of JP-2001-196048, from the Japanese Patent Office website (doc dated Jul. 2001).*
Computer-generated English translation of JP-10-208768, from the Japanese Patent Office website (doc date Aug. 1998).*
English Language Abstract of JP 10-208768.

(Continued)

*Primary Examiner*—Stephen J. Kalafut
(74) *Attorney, Agent, or Firm*—Greenblum & Bernstein, P.L.C.

(57) ABSTRACT

Electrode plate assemblies forming independent elements for electromotive force each contained in a partition member are series-connected and accommodated in a battery case. Each element is constructed as a nickel-metal hydride rechargeable battery cell and has an electromotive force of predetermined voltage, and so the battery connected in series has an output voltage and can be applied to general-purpose uses.

10 Claims, 9 Drawing Sheets

OTHER PUBLICATIONS

English Language Abstract of JP 2001-196048.
English Language Abstract of JP 63-299051.
English Language Abstract of JP 2001-126690.
English Language Abstract of JP 2001-57199.

* cited by examiner

CLOSED ALKALINE STORAGE BATTERY

TECHNICAL FIELD

The present invention relates to a sealed alkaline rechargeable battery, such as a nickel-metal hydride rechargeable battery, which is configured to have a structure that enables it to have higher electromotive force or output voltage so as to be applicable to general purpose uses.

BACKGROUND ART

The present invention is directed to relatively small sized rechargeable batteries used as a power source for mobile electronic devices such as mobile phones or mobile personal computers and wireless equipment such as cordless phones, e.g., a nickel-metal hydride rechargeable battery, a nickel-cadmium rechargeable battery, and so on.

Nickel-metal hydride rechargeable batteries satisfy all the three requirements for the battery power source of mobile or electric equipment: High capacity, high energy density, and good cost performance. Because of the low electromotive force (nominal voltage: 1.2V), however, one cell can hardly supply a voltage required for operating the equipment, and so in most cases a plurality of cells are connected in series to provide the required output voltage. Most commonly, the cells are series-connected and constructed as a battery pack.

Figure 8:
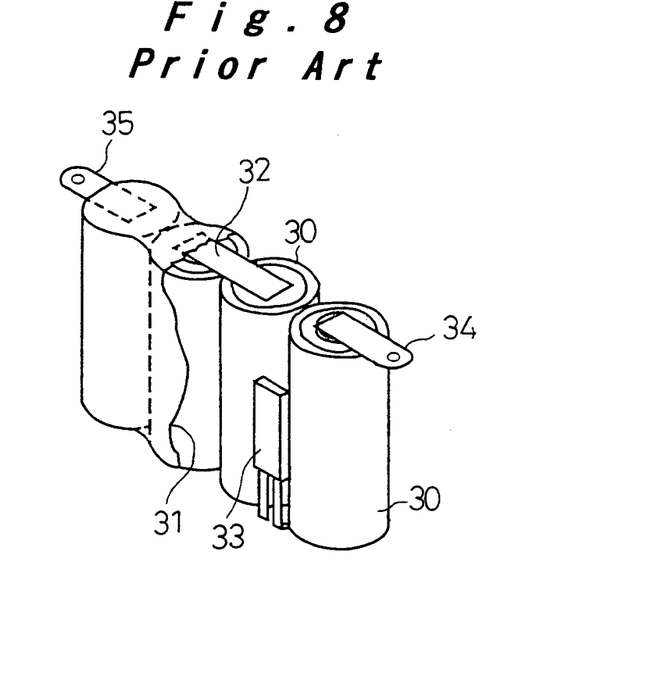
FIG. 8 is a perspective view of a conventional battery pack using cylindrical cells.

A battery pack consists of several series- or series-parallel-connected cells packed with a heat shrinkable tube or the like to be united as one body. FIG. 8 shows the widely known structure of one such battery pack: Four cylindrical cells 30 are connected in series with connecting plates 32; a thermal protector 33 is interposed in the series circuit; positive and negative terminals 34 and 35 are respectively attached to the cells 30 at either end such as to extend to the outside; and the cells are entirely packed with a heat shrinkable tube 31.

Japanese Patent Laid-Open Publication No. Hei 13-126690 shows another type of battery pack: A plurality of (three in the example) series-connected prismatic cells 200 are accommodated in a frame body 101, as shown in FIG. 9.

Figure 10:
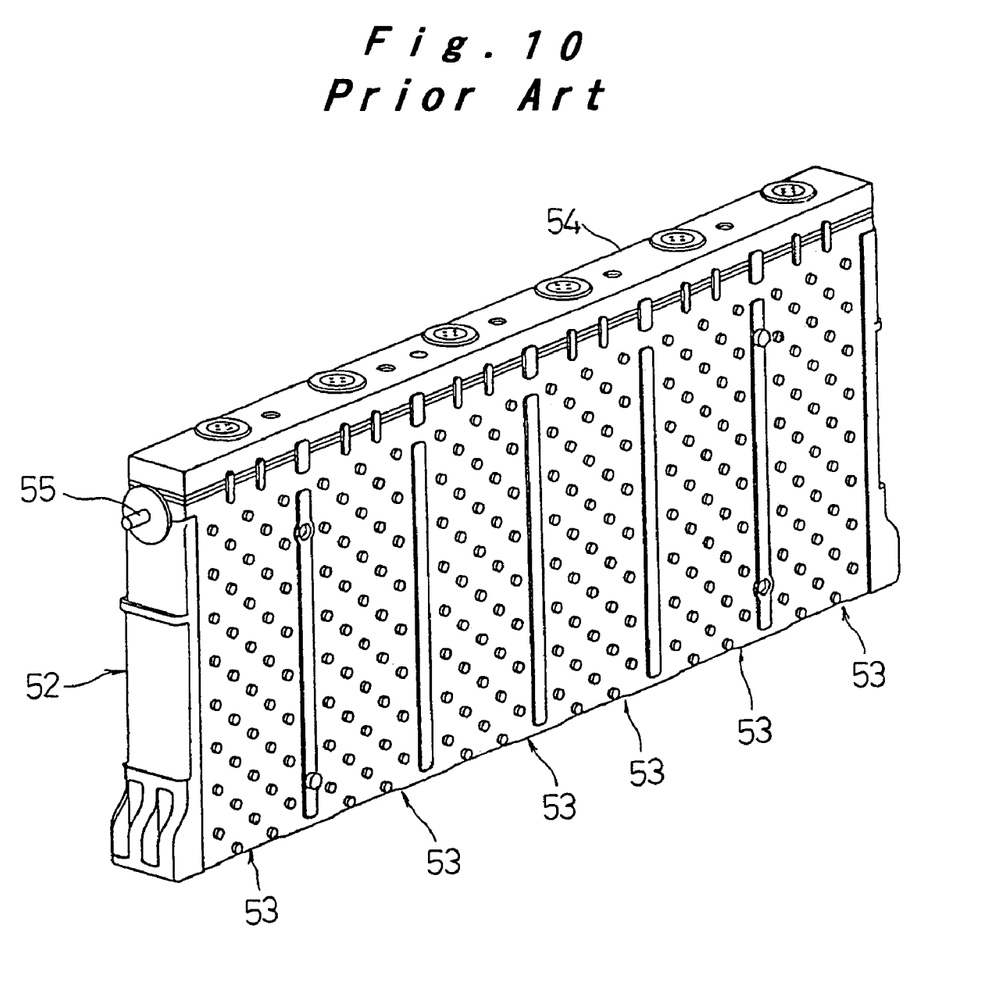
FIG. 10 is a perspective view of a conventional battery module for fixed installation.

Further, Japanese Patent Laid-Open Publication No. 2001-57199 shows a battery module for constructing a rechargeable battery pack suited for high power applications such as electric or hybrid electric/gasoline vehicles. A plurality of (six in the example) cell cases 53 that each accommodate elements for electromotive force are united as one-piece battery case 52 to form a battery module from a plurality of rechargeable batteries, as shown in FIG. 10. In this battery module, the plurality of rechargeable batteries are coupled together such that each two adjacent cell cases 53 share the end wall between them, and that the elements for electromotive force in each cell are connected in series. Several such battery modules are further coupled side by side, and the side walls of the battery case have numerous bosses and ribs that will form air passages for effective heat dissipation between adjacent battery modules. The upper open end of the united battery case 52 is closed by a lid 54. The inside of the battery case 52 is divided by partitions or the end walls of the cell cases 53. Suitable connection means are provided to connect the elements for electromotive force of adjacent cells in series. The cells at either end are connected to input/output terminals 55 attached at both ends of the battery case.

Batteries that generate low electromotive force as one cell such as nickel-metal hydride batteries have conventionally been constructed as a battery pack or module as described above so as to provide the voltage that the equipment requires to operate. Battery packs necessitate various constituent elements other than the cells themselves and tend to have increased costs and volumes.

Figure 9:
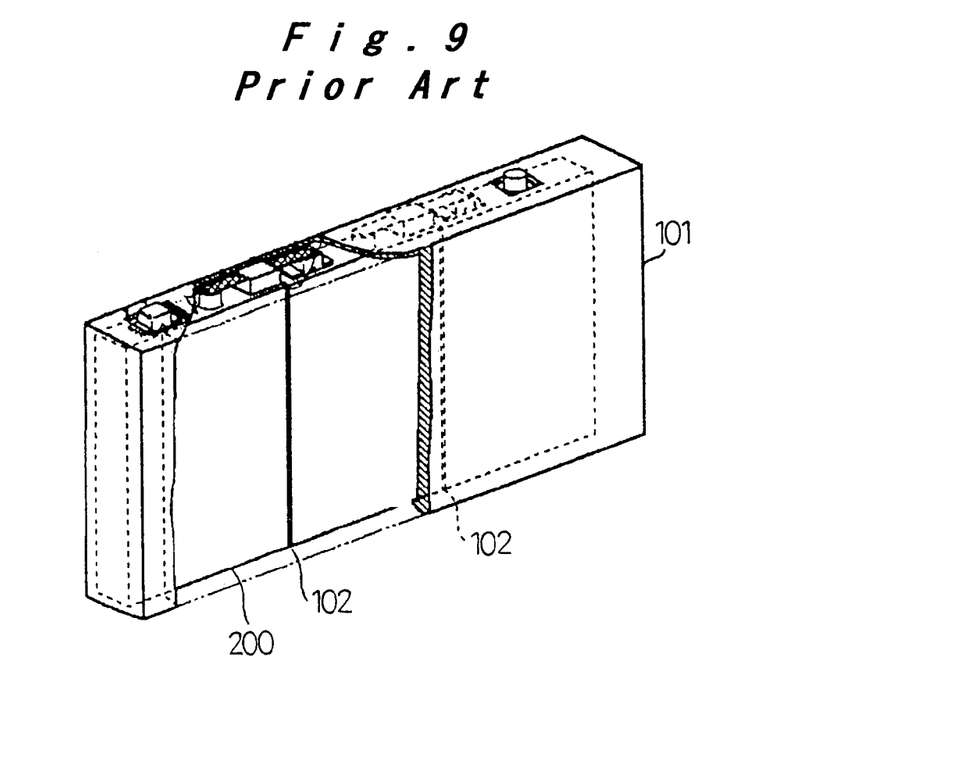
FIG. 9 is a perspective view of a conventional battery pack using prismatic cells.

In the structures shown in FIG. 8 and FIG. 9 where a plurality of cells are connected in series, adjacent cells are oriented upside down so that the cells are readily connected in series. Some cells are therefore always inverted, with their sealing parts facing down. Since there is some space in the sealing part between the electrode plate assembly and sealing plate, it is possible that liquid electrolyte leaks into this space if the cells stand upside down for long time.

What is worse, battery packs that use pack cases or heat shrinkable tubes as means of binding a plurality of cells are low in mechanical strength and necessitate a reinforcement especially when used for mobile devices or electric tools.

An object of the present invention is to provide a novel structure that enables an alkaline rechargeable battery, which as one cell has low electromotive force, to have a higher output voltage applicable to various equipment, without resorting to common battery pack structures.

DISCLOSURE OF THE INVENTION

To achieve the above object, according to a first aspect of the invention, a sealed alkaline rechargeable battery includes a metal battery case, a plurality of series- and/or parallel-connected elements for electromotive force each contained in an insulating partition member in the battery case, a sealing plate for sealing the battery case, and a positive terminal and a negative terminal connected to the elements for electromotive force and exposed from the sealing plate.

With the sealed alkaline rechargeable battery according to the first aspect of the invention that accommodates a plurality of series-connected elements for electromotive force each contained in the partition member, an alkaline rechargeable battery such as nickel-metal hydride rechargeable battery, that generates low electromotive force as one cell, has an output voltage that is applicable to general purpose uses. Not only the output voltage but also the discharge capacity of the battery can be increased by connecting the elements for electromotive force in series-parallel. Conventionally, such object was achieved by constructing several batteries into a battery pack; the invention has achieved this object by providing a novel structure for the battery to have higher output voltage, whereby the numbers of components and process steps are much reduced.

According to a second aspect of the invention, a sealed alkaline rechargeable battery includes a metal battery case, a plurality of series- and/or parallel-connected elements for electromotive force each contained in an insulating partition member in the battery case, a sealing plate for sealing an open end of the battery case, a plurality of constituent elements having conductive surfaces arranged on an outer face of the sealing plate and electrically connected to the plurality of elements for electromotive force, and an insulating plate for closing the outer face of the sealing plate, having openings for allowing the conductive surfaces of the constituent elements to be exposed to the outside to serve as a positive terminal and a negative terminal.

According to the second aspect of the invention, unlike a battery pack that includes several batteries, the battery accommodates a plurality of elements for electromotive force each contained in the partition member so as to have higher output voltage and capacity as one battery. The sealing plate for sealing the battery case is further covered by the insulating plate, and various parts such as terminal elements, safety vent, and protective elements can be arranged between the sealing plate and insulating plate, such that the conductive surfaces of the constituent elements are exposed to the outside through the openings in the insulating plate to serve as the positive and negative terminals. The battery is thus provided with safety features, as well as high power capacity.

Connecting members for electrically connecting the plurality of elements for electromotive force are partly provided with an insulating coat as means for preventing liquid electrolyte transfer between the elements. As the means for preventing liquid electrolyte transfer, the connecting members may, for instance, be insertion molded in a resin plate such that connection parts at both ends thereof are exposed. That way, liquid electrolyte transfer is prevented reliably.

The battery includes a space common to all the elements for electromotive force, and the sealing plate includes a discharge vent for releasing internal pressure built up to a preset level in the space. A pressure build-up inside the sealed battery case due to generation of gas from the elements for electromotive force because of abnormal use may lead to explosion. In the event of a pressure build-up, the discharge vent communicating to the space common to all the elements for electromotive force releases the internal pressure, to prevent battery explosion.

The battery includes an element for protecting the battery from excessive current and excessive heat, the element being series-connected to a circuit connecting a positive or negative electrode. When the positive and negative terminals are short-circuited for some reason such as malfunction in the device to which the battery is connected, the protective element trips and increases resistance to limit the current flow, thereby protecting the battery from damage.

An electrode of the protective element, or a metal part forming the discharge vent, which are arranged on the outer face of the sealing plate, can be used to configure the positive or negative terminal, to reduce the number of parts required for the terminals. The size and cost of the battery is thereby reduced.

The elements for electromotive force include electrode plate assemblies, and they can have either a laminated structure in which a plurality of positive and negative electrode plates are stacked upon one another with separators interposed therebetween, or, a coiled structure in which positive and negative electrode plates are wound around with a separator interposed therebetween.

The liquid electrolyte that constitutes the elements for electromotive force should preferably be in the form of a gel. By thus regulating the flowability of liquid electrolyte, the liquid transfer between the elements is well prevented.

The partition member can be a bottomed tube partitioned to have a plurality of chambers therein to accommodate the plurality of elements for electromotive force, so as to collectively contain the plurality of elements with a single partition member.

The positive and/or negative terminal should preferably be plated with gold so as to reduce contact resistance of the terminals that are to be connected to a device, and to improve wear strength and corrosion resistance. These effects will be achieved only by applying the gold plate to parts of the positive and/or negative terminal that are exposed to the outside.

BEST MODE FOR CARRYING OUT THE INVENTION

Preferred embodiments of the present invention will be hereinafter described with reference to the accompanying drawings. The embodiments shown below are examples only and should not limit the technical scope of the invention.

Figure 1:
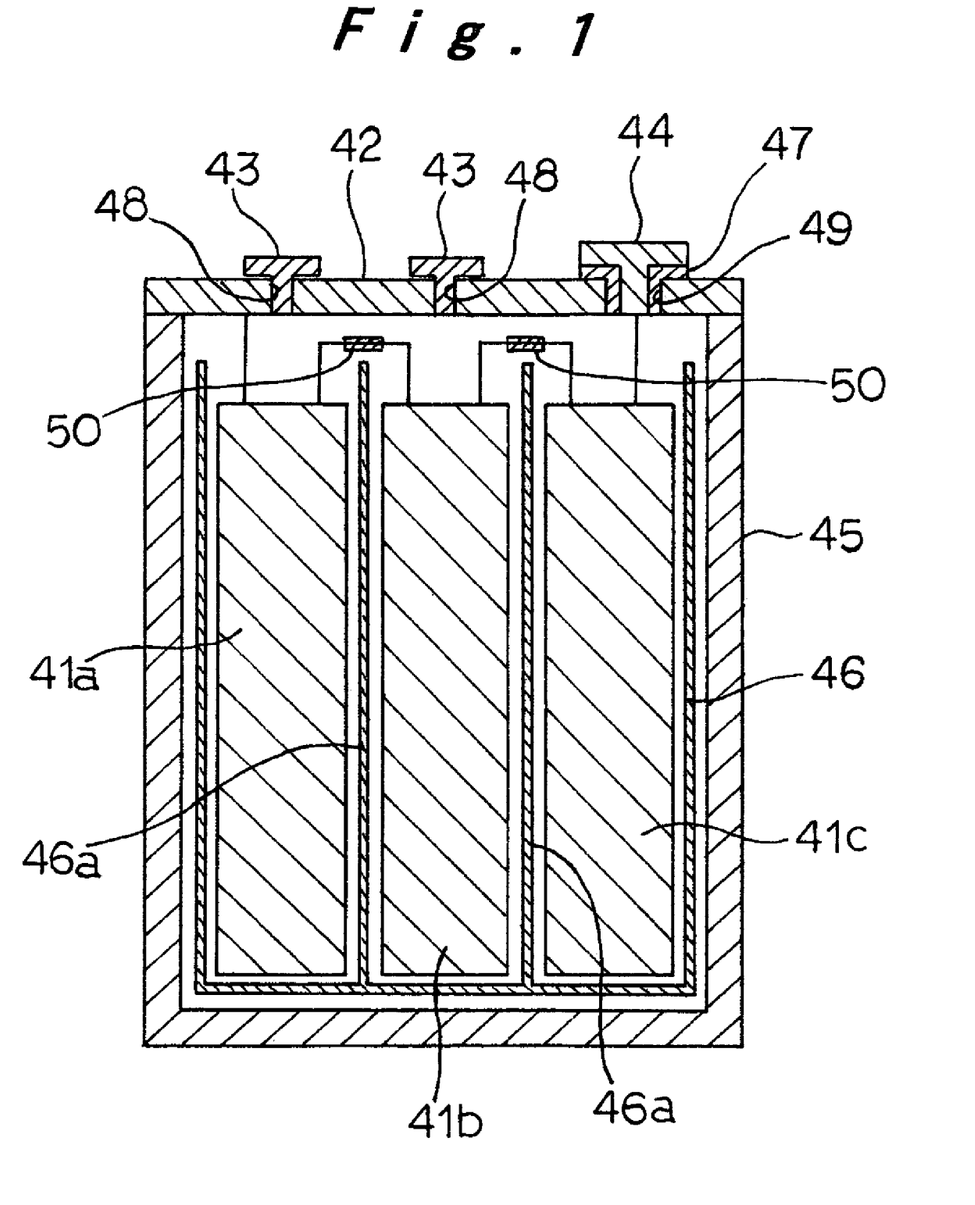
FIG. 1 is a cross section of a sealed alkaline rechargeable battery according to a first embodiment of the invention.

The sealed alkaline rechargeable battery according to one embodiment is a nickel-metal hydride rechargeable battery whose output voltage across the positive and negative terminals is 3.6V. FIG. 1 is a cross section illustrating the basic structure of this embodiment.

Inside a battery case 45 is an insulating bag or partition member 46 that is divided into three independent chambers by partitions 46a for accommodating elements for electromotive force, as shown in FIG. 1. Each chamber contains an electrode plate assembly 41a, 41b, 41c. The adjacent electrode plate assemblies are series-connected via positive and negative electrode leads extending from respective positive and negative electrode plates. The open end of the battery case 45 is closed by a sealing plate 42 that has three holes 48, 49 at locations corresponding to the electrode plate assemblies 41a, 41b, 41c. After sealing the battery case with the plate, liquid electrolyte is injected through the holes 48, 49 into the three chambers divided by the partitions 46a. Two of the holes 48 are then closed with plugs 43, and the other hole 49 is closed with a plug 44 with a gasket 47 interposed therebetween.

The positive side of the series-connected electrode plate assemblies 41a, 41b, and 41c is connected to the plug 44, and the negative side is connected to the sealing plate 42 as seen from the drawing. Thus, the plug 44 is used as the positive terminal, and the sealing plate 42 or the battery case 45 is used as the negative terminal for external connection.

Three elements for electromotive force that each have an electromotive force of 1.2V are thus series-connected and contained in one battery case 45. This structure allows one sealed alkaline rechargeable battery to have an output voltage of 3.6V, unlike a conventional battery pack that contains several batteries. In order to prevent possible inter-chamber electrolyte transfer through the connection leads due to a difference in electrical potential, the connection leads that bridge across adjacent elements for electromotive force should preferably be provided with an insulating coat 50 as shown in the drawing as means for preventing the electrolyte transfer.

A second embodiment described below is formed by further developing the structure of the above first embodiment and has improved practical applicability.

Figure 2:
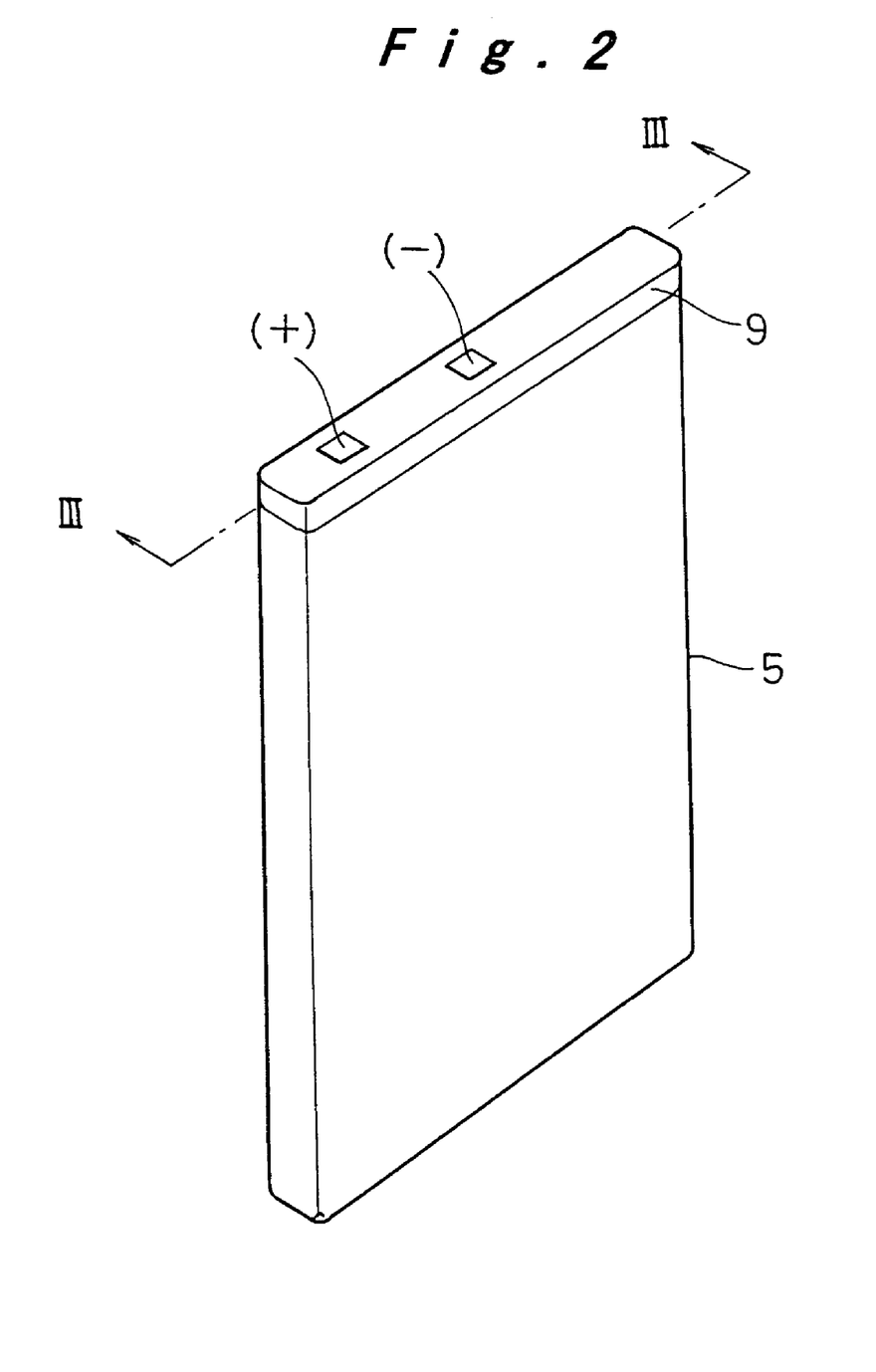
FIG. 2 is a perspective view showing the external appearance of a 3.6V nickel-metal hydride rechargeable battery according to a second embodiment of the invention.

The sealed alkaline rechargeable battery according to the second embodiment is a flat and prismatic battery as shown in FIG. 2, having a positive terminal (+) and a negative terminal (−) on its top face. The shape, size, and output voltage of this battery are substantially the same as a commonly known prismatic lithium ion rechargeable battery, so that it can be used in applications where nickel-metal hydride rechargeable batteries are used instead of lithium ion batteries.

Figure 3:
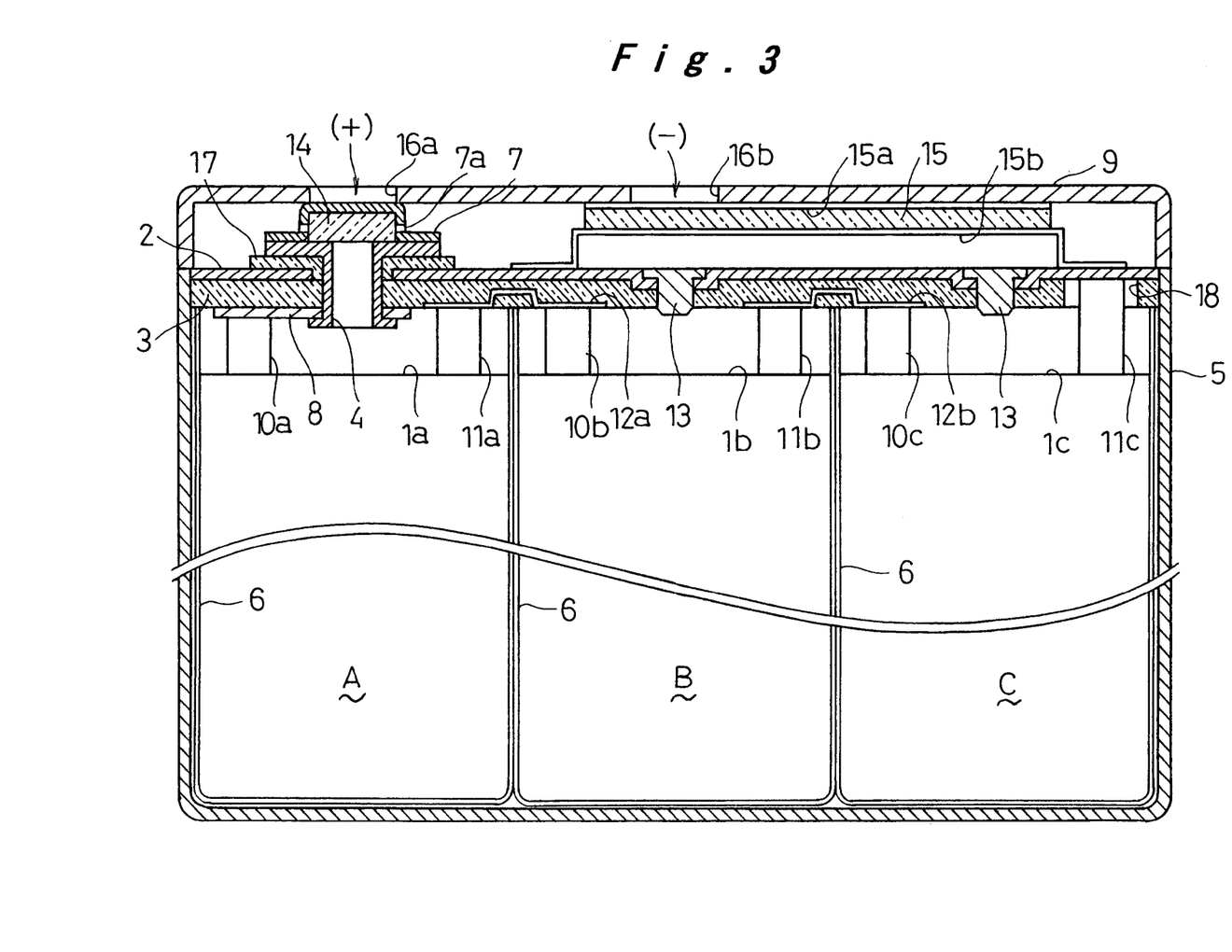
FIG. 3 is a cross section of the rechargeable battery of FIG. 2.

FIG. 3 is a cross section taken in the direction of arrows along the line III-III of FIG. 2, illustrating the internal structure of this sealed alkaline rechargeable battery. A battery case 5 formed of a nickel-plated steel plate in a bottomed, square tubular shape by a press forming process contains first to third elements for electromotive force A, B, and C each enveloped in polypropylene bags (partition members) 6. Each element for electromotive force A-C is constructed with an electrode plate assembly including positive and negative electrode plates and separators, and liquid electrolyte, as well known. More specifically, a plurality of positive and negative electrode plates are stacked with separators interposed therebetween to form the first, second, and third electrode plate assemblies 1a, 1b, and 1c, which are accommodated in the bags 6 together with alkaline liquid electrolyte. Each of the elements constitutes an independent nickel-metal hydride rechargeable battery cell. The bags 6 can be made of polyolefin resins such as polypropylene, as well as fluoride resins and polyphenylene sulfide resins. Instead of using separate bags for each of the elements for electromotive force A-C, one partition member may be divided into chambers as has been shown in the first embodiment in FIG. 1. Either way, the desired structure can readily be made using a resin molding process.

Figure 4:
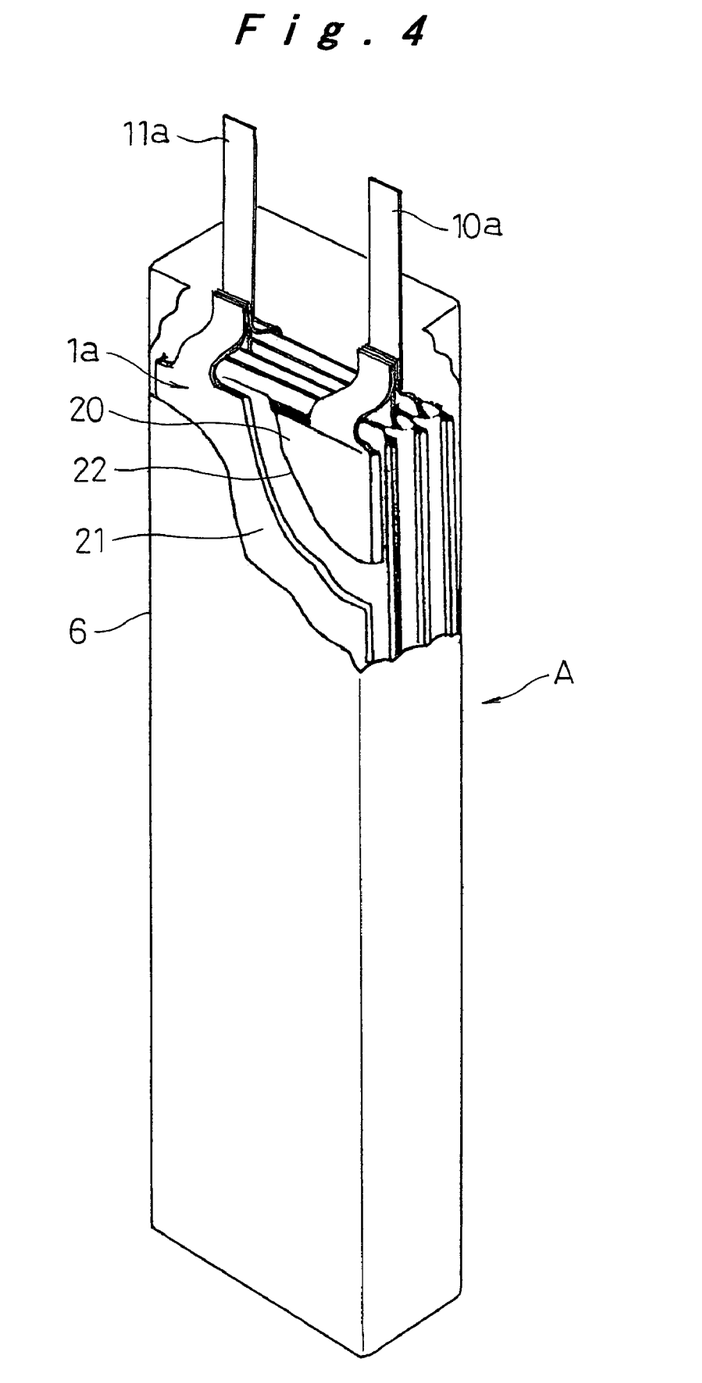
FIG. 4 is a perspective view of elements for electromotive force constituting the rechargeable battery.

FIG. 4 shows the structure of the element for electromotive force A (the elements B and C have the same structure). A plurality of positive electrode plates 20 enveloped in bag-shaped separators 22 and a plurality of negative electrode plates 21 are stacked alternately to form the electrode plate assembly 1a, and accommodated in the bag 6. Leads that extend from the positive electrode plates 20 are bound and welded to one end of the positive electrode lead 10a. Similarly, leads extending from the negative electrode plates 21 are bound and welded to one end of the negative electrode lead 11a.

The bag 6 containing this electrode plate assembly 1a, constituted by the positive and negative electrodes 20 and 21, and the separator 22, is filled with alkaline liquid electrolyte. Since the top end of the bag 6 is open, the alkaline liquid electrolyte should preferably be in gel form. The alkaline liquid electrolyte can be turned instantly into a gel when injected into the bag 6 by applying a mixture of compounds chiefly composed of a gelling agent in the separators or by impregnating the separators with a gelator compound beforehand. In this case, the liquid electrolyte should preferably contain 1 to 15 weight % of organic compounds so as to have higher viscosity. If the amount is less than that, the viscosity will not be high enough to restrict the mobility of the alkaline liquid. On the other hand, if the liquid contains more than 15 weight % of organic compounds, they will take up too much volume inside the battery, lowering the volume energy density of the battery, as well as deteriorating gas permeation properties of the electrode plates, which may lead to a rapid build-up of battery internal pressure during charging.

For the gelling agent of the alkaline liquid electrolyte, any polymers that have hydrophilic side chains can suitably be used. Examples of such polymers are: polyacrylate, polymethacrylate, acrylate/methacrylate copolymer, isobutylene/maleate copolymer, poly(2-acrylamide-2-methylpropane sulfonate), polyacryloxy propane sulfonate, polyvinyl sulfonate, and other salts of alkaline metals. They do not necessarily have to be in the form of the salts of alkaline metals, and can be used either alone or in combination. Potassium polyacrylate, sodium polyacrylate, potassium polymethacrylate, and sodium polymethacrylate are particularly preferable. Further, the gelling agent should preferably be a crosslinking polymer. Crosslinking can be achieved by adding a crosslinking agent such as divinylbenzen when polymers such as polyacrylate, polymethacrylate, and acrylate/methacrylate copolymer are prepared.

Bags 6 each containing the first to third electrode plate assemblies 1a, 1b, 1c are then accommodated in the battery case 5, and the positive and negative leads 10a-10c, 11a-11c extending from the electrode plate assemblies 1a-1c are connected to preset locations.

The sealing plate 2 for sealing the battery case 5 has a resin plate 3 bonded to its inner side. Both the sealing plate 2 and resin plate 3 have through holes at locations corresponding to the first to third electrode plate assemblies 1a-1c, through which liquid electrolyte is filled in each of the bags 6. To the through hole above the first electrode plate assembly 1a is fitted a hollow rivet 4 with a washer 8 fixedly held between the rivet and resin plate 3. A gasket 17 provides insulation between the rivet and sealing plate 2.

Connecting plates 12a, 12b are insertion molded in the resin plate 3 at two locations. such that they are partly exposed to the inside of the battery case 5 for the series-connection between the first to third electrode plate assemblies 1a-1c. The positive electrode lead 10a extending from the first electrode plate assembly 1a is welded to the washer 8, and the negative electrode lead 11a is welded to one of the exposed parts of the connecting plate 12a. The positive electrode lead 10b extending from the second electrode plate assembly 1b is welded to the other one of the exposed parts of the connecting plate 12a, and the negative electrode lead 11b is welded to one of the exposed parts of the connecting plate 12b. The positive electrode lead 10c extending from the third electrode plate assembly 1c is welded to the other one of the exposed parts of the connecting plate 12b, and the negative electrode lead 11c is welded to the sealing plate 2 through an opening 18 formed in the resin plate 3. Thus, the first to third electrode plate assemblies 1a-1c are connected in series between the washer 8 as the positive terminal and the sealing plate 2 as the negative terminal. Because they are connected in series through the connecting plates 12a, 12b that are insertion molded in the resin plate 3, the portions of the connecting plates 12a, 12b that are embedded in the resin plate 3 provide insulation, whereby electrolyte transfer between adjacent elements for electromotive force caused by the potential difference through the positive and negative electrode leads 10b, 11a and 10c, 11b is prevented.

After establishing connection between the first to third electrode plate assemblies 1a-1c, the sealing plate 2 is joined to the open end edge of the battery case 5 by laser welding to seal the case 5. Alkaline liquid electrolyte is then injected into the bag 6 containing the first electrode plate assembly 1a through the hollow part of the rivet 4 mounted to the sealing plate 2. Similarly, the bags 6 containing the second and third electrode plate assemblies 1b, 1c are filled with liquid electrolyte that is injected through the respective through holes thereabove, which are then sealed with plugs 13, as shown in FIG. 3.

A rubber vent 14 is placed on the rivet 4, and a positive electrode cap 7 entirely covering the rubber vent 14 is welded over the rivet 4, thereby closing its hollow part. The upper face of the positive electrode cap 7 is exposed to the outside through a positive electrode opening 16a in a resin cover 9 that covers various battery elements over the sealing plate 2, to be used as the positive terminal (+) of the battery. The rubber vent 14 works as a safety vent for releasing internal pressure to the outside, should there be a rapid rise in the pressure inside the battery case 5 due to abnormal use or the like. The positive electrode cap 7 has a plurality of discharge holes 7a in its side face, which are closed by the rubber vent 14 during normal use. When the pressure inside the battery case 5 builds up and reaches a preset limit where the rubber vent 14 is compressed, the pressure is released from the discharge holes 7a. This safety feature prevents battery explosion caused by a pressure build-up resulting from generation of gas inside the battery due to abnormal use or the like.

A PTC element 15 (for protecting the battery from excessive current and excessive heat) is attached on the upper face of the sealing plate 2; an extension of its lower electrode 15b is welded to the sealing plate 2, and part of its upper electrode 15a is exposed to the outside through a negative electrode opening 16b in the resin cover 9 that covers various battery elements over the sealing plate 2, to be used as the negative terminal (−) of the battery.

The PTC element 15 is a Positive Temperature Coefficient type thermistor, whose resistance increases rapidly when its temperature exceeds a preset limit. When the positive (+) and negative (−) terminals are short-circuited for some reason, the short circuit current through the PTC element 15 connected in series with the charge/discharge circuit raises the temperature of the PTC element 15. When the temperature reaches a preset limit, the PTC element trips or turns into a high resistance state, thus limiting the current flow. Damage to the rechargeable battery due to short circuits is thus prevented. Because the PTC element 15 increases its resistance in response to not only the heat resulting from excessive current but also a rise in the ambient temperature, it also prevents the battery from being used under extremely high temperatures. For example, if the battery or the device having the battery inside is left in a parked car in hot weather in summer, the battery temperature can reach up to more than 80° C. The PTC element 15 is tripped under such circumstance and the resistance is high so that the battery is not used under such high temperature. When the temperature lowers, the resistance of the PTC element 15 lowers too, and the battery can be used again.

The nickel-metal hydride rechargeable battery is complete when the resin cover 9 is joined to the battery case 5 and sealing plate 2; the positive (+) and negative (−) terminals are exposed on its top face as shown in FIG. 2. The battery can further be packaged with a heat shrinkable sheet or the like printed with the product name, rating, and cautions.

The positive (+) and/or negative (−) terminal should preferably be plated with gold at least in the exposed portion. This is for reducing contact resistance of the positive (+) and negative (−) terminals, which make contact with terminals such as probes on the device side. Because gold hardly allows an oxide film to form and has low intrinsic resistance, it is advantageously applied to the portions exposed to outside, or the contact surface of the terminals to reduce the contact resistance. Gold is also excellent in corrosion resistance; an increase in the contact resistance or contact failure due to corrosion on the contact surface is thus prevented.

In the above embodiment, since an upper face of the positive electrode cap 7 forms the positive terminal (+) and the upper electrode 15a of the PTC element 15 forms the negative terminal (−), it is preferred that parts thereof exposed to outside are plated with gold. Alternatively, the positive electrode cap 7 and the upper electrode 15a of the PTC element 15 can be plated with gold entirely before being assembled into the battery.

Figure 5:
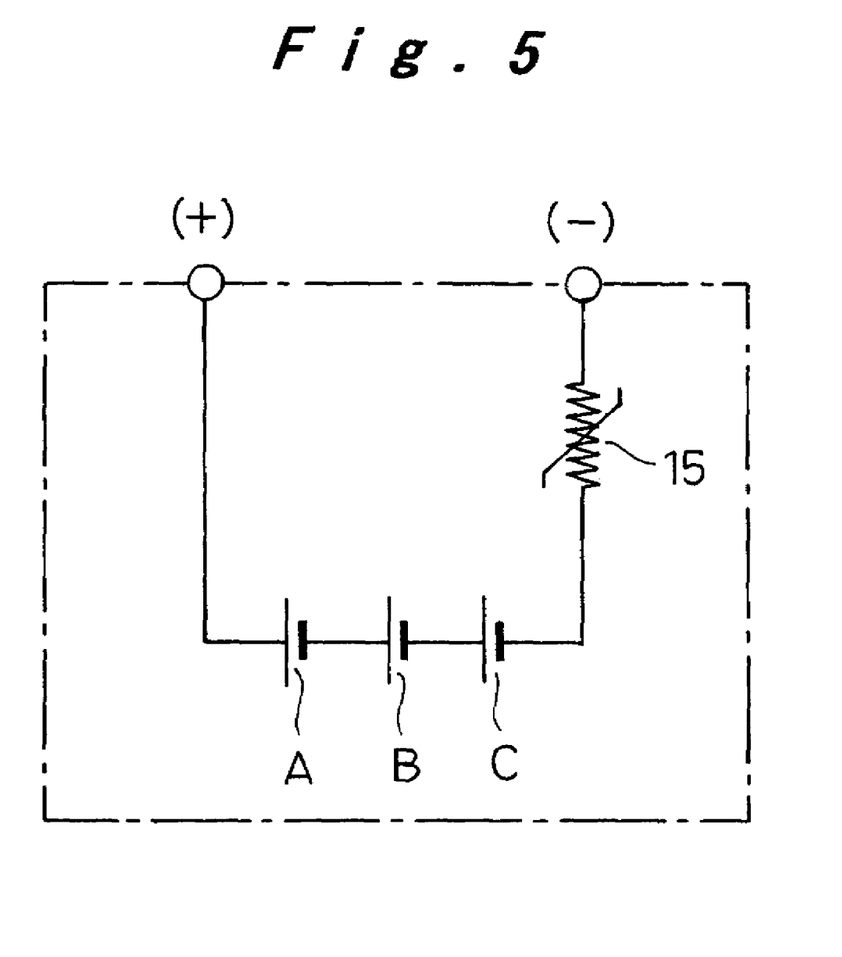
FIG. 5 is the circuit diagram of the rechargeable battery.

FIG. 5 is the circuit diagram of the battery. The three elements for electromotive force A-C are connected in series between the positive (+) and negative (−) terminals. The PTC element 15 for preventing the battery from external short circuits and the like is series-connected. Thus, the nickel-metal hydride rechargeable battery has an output voltage of 3.6V.

The 3.6V nickel-metal hydride rechargeable battery of the above embodiment is only one example, and the number of elements for electromotive force is obviously not limited to three. By suitably selecting the number of elements and by connecting these in series and/or parallel, a sealed alkaline rechargeable battery of desired output voltage and discharge capacity is constructed.

Figure 6:
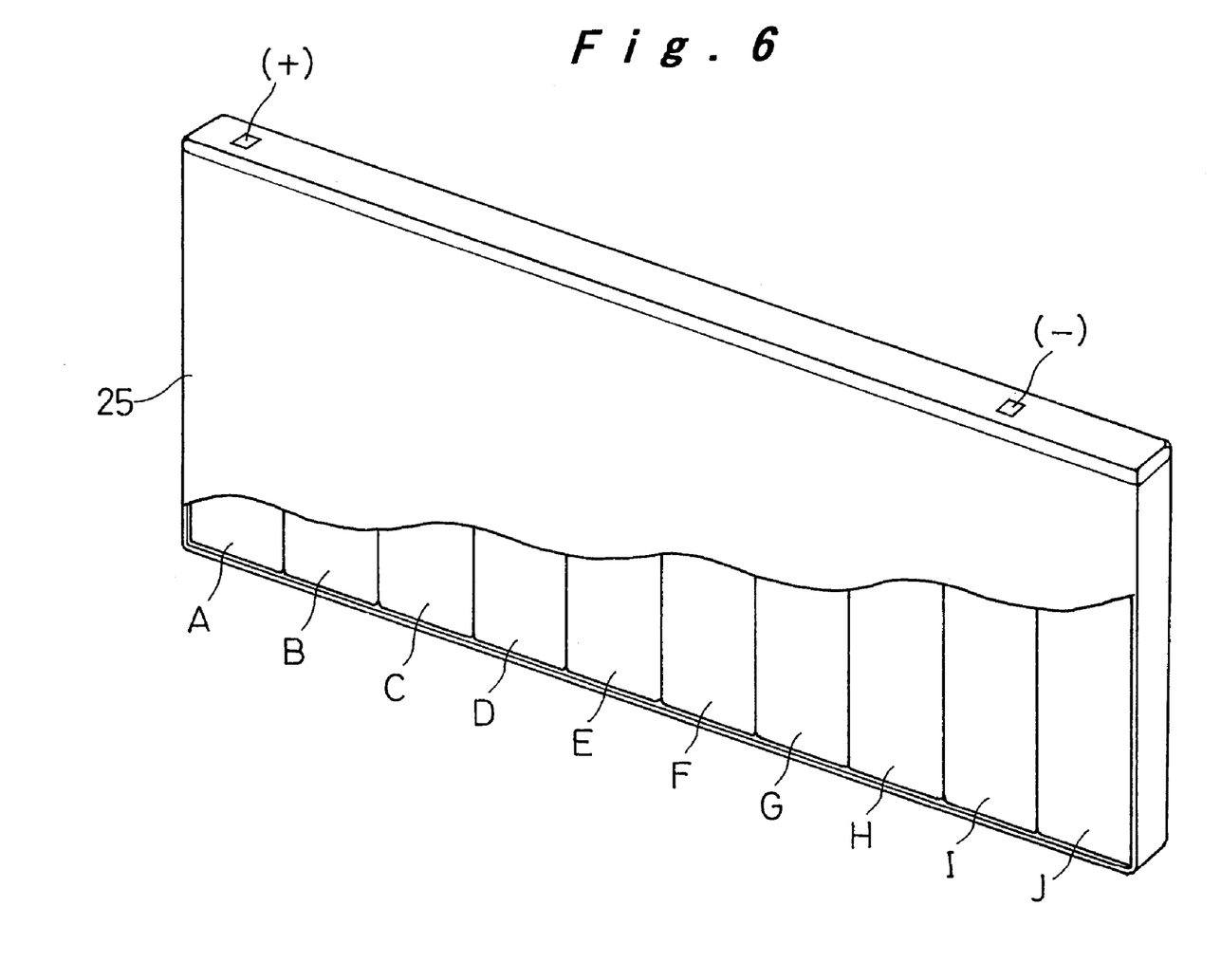
FIG. 6 is a perspective view of a 12V nickel-metal hydride rechargeable battery according to a third embodiment of the invention.
Figure 7:
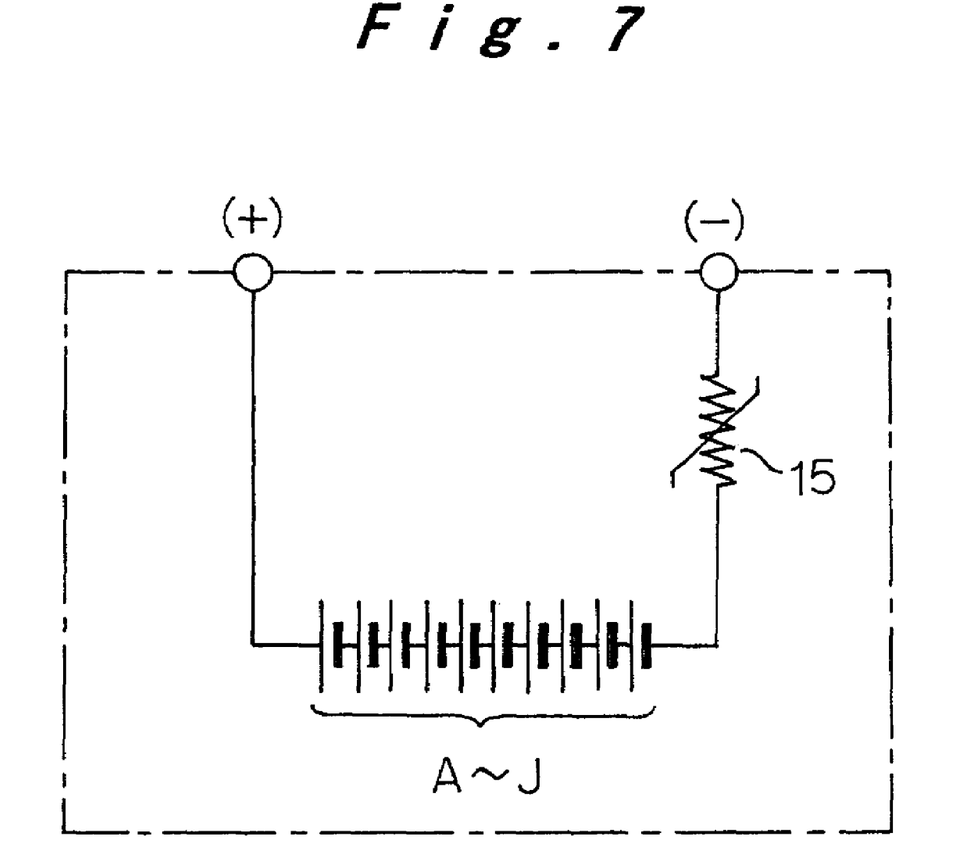
FIG. 7 is the circuit diagram of the rechargeable battery of FIG. 6.

FIG. 6 shows a third embodiment, which is a 12V nickel-metal hydride rechargeable battery; ten elements for electromotive force A-J are accommodated in the battery case 25. The structure of the battery is basically the same as the previously described 3.6V nickel-metal hydride rechargeable battery, except the shape of the battery case 25 designed to accommodate the increased number of the elements A-J. FIG. 7 is the circuit diagram of this 12V nickel-metal hydride rechargeable battery. The ten elements A-J are connected in series to obtain an output voltage of 12V, and a PTC element 15 is series-connected to protect the battery from short circuits and the like.

In the above embodiments, the electrode plate assemblies 1a to 1c forming the elements A-J for electromotive force have a laminated structure. Instead of this laminated structure, a coiled structure, in which strips of positive and negative electrode plates are wound around into a flat shape with a separator interposed therebetween can also be adopted.

INDUSTRIAL APPLICABILITY

As described above, the sealed alkaline rechargeable battery according to the invention contains a plurality of series-connected elements for electromotive force in the battery case. Nickel-metal hydride rechargeable batteries that generate low electromotive force as a cell can therefore be constructed to have a higher output voltage for general purpose uses. By connecting the elements for electromotive force in series-parallel, the discharge capacity of the battery can also be increased.

Further, the battery according to the invention has the advantage over the conventional battery packs in that it necessitates fewer numbers of components and process steps.

The invention claimed is:

1. A sealed alkaline rechargeable battery comprising:
   a metal battery case;
   a plurality of series- and/or parallel-connected elements for electromotive force each contained in an insulating partition member in the battery case, said elements for electromotive force including a gel liquid electrolyte;

a sealing plate for sealing the battery case;

a positive terminal and a negative terminal connected to said elements for electromotive force and exposed from the sealing plate;

a resin plate provided on a lower surface of said sealing plate and having connecting members insertion molded therein, wherein the connecting members have connection parts provided on ends thereof and exposed from said resin plate to electrically connect said elements for electromotive force, and wherein said resin plate engages the partition member to prevent transfer between liquid electrolytes of said elements for electromotive force; and wherein each of said elements for electromotive force are provided within a common space covered by said sealing plate, and wherein said sealing plate includes a discharge vent which releases internal pressure built up to a preset level in the space.

2. A sealed alkaline rechargeable battery comprising:

a metal battery case;

a plurality of series- and/or parallel-connected elements for electromotive force each contained in an insulating partition member in the battery case, said elements for electromotive force including a gel liquid electrolyte;

a sealing plate for sealing an open end of the battery case;

a plurality of constituent elements having conductive surfaces arranged on an outer face of the sealing plate and electrically connected to said plurality of elements for electromotive force;

an insulating plate for closing the outer face of the sealing plate, the insulating plate having openings for allowing said conductive surfaces of the constituent elements to be exposed to the outside to serve as a positive terminal and a negative terminal;

a resin plate provided on a lower surface of said sealing plate and having connecting members insertion molded therein, wherein the connecting members have connection parts provided on ends thereof and exposed from said resin plate to electrically connect said elements for electromotive force, and wherein said resin plate engages the partition member to prevent transfer between liquid electrolytes of said elements for electromotive force; and wherein each of said elements for electromotive force are provided within a common space covered by the sealing plate, and wherein said sealing plate includes a discharge vent which releases internal pressure built up to a preset level in the space.

3. The sealed alkaline rechargeable battery according to claim 2, wherein the battery includes an element for protecting the battery from excessive current and excessive heat, the element being series-connected to a circuit connecting one of a positive electrode and a negative electrode.

4. The sealed alkaline rechargeable battery according to claim 2, wherein said sealing plate includes an element for protecting the battery from excessive current and excessive heat arranged on the outer face, the element having an electrode plate formed as one of said positive and negative terminals.

5. The sealed alkaline rechargeable battery according to claim 2, wherein one of said positive and negative terminals includes a metal part that forms a discharge vent.

6. The sealed alkaline rechargeable battery according to claim 2, wherein said elements for electromotive force include electrode plate assemblies having a laminated structure in which a plurality of positive and negative electrode plates are stacked upon one another with separators interposed therebetween.

7. The sealed alkaline rechargeable battery according to claim 2, wherein said elements for electromotive force include electrode plate assemblies having a coiled structure in which positive and negative electrode plates are wound around with a separator interposed therebetween.

8. The sealed alkaline rechargeable battery according to claim 2, wherein said partition member is a bottomed tube partitioned to have a plurality of chambers therein to accommodate said plurality of elements for electromotive force.

9. The sealed alkaline rechargeable battery according to claim 2, wherein at least one of said positive and negative terminals is plated with gold.

10. The sealed alkaline rechargeable battery according to claim 9, wherein at least one of said positive and negative terminals is gold-plated only in portions that are exposed to the outside.

* * * * *